United States Patent
Sofia

[15] 3,673,383
[45] June 27, 1972

[54] ELECTRICALLY HEATED SCRAPING TOOL

[72] Inventor: George V. Sofia, 2202 E. 8th St., Brooklyn, N.Y. 11223

[22] Filed: Sept. 15, 1970

[21] Appl. No.: 72,253

[52] U.S. Cl. .............................. 219/227, 15/236 R, 30/140, 30/169, 30/312, 219/238, 219/533
[51] Int. Cl. ................... A47l 13/02, H05b 1/00, B26b 3/00
[58] Field of Search .................. 219/221, 227–241; 30/140, 312, 169, 170; 15/236 R

[56] References Cited

UNITED STATES PATENTS

| | | | |
|---|---|---|---|
| 1,732,076 | 10/1929 | Alderman et al. | 30/140 X |
| 1,772,616 | 8/1930 | Ruhl | 30/140 X |
| 2,295,075 | 9/1942 | Burrows et al. | 219/231 |
| 2,304,559 | 12/1942 | Engesser | 219/328 UX |
| 2,618,004 | 11/1952 | Heyder | 30/140 X |
| 3,331,131 | 7/1967 | Perry et al. | 30/140 |
| 3,448,517 | 6/1969 | Cothery | 30/140 |

FOREIGN PATENTS OR APPLICATIONS

| | | | |
|---|---|---|---|
| 168,379 | 5/1951 | Austria | 15/236 R |
| 561,595 | 5/1944 | Great Britain | 15/236 R |

Primary Examiner—A. Bartis

[57] ABSTRACT

A glazier's tool for use in scraping the windshield retaining channel of an automobile includes a case having electric heating means therein in heat exchange relationship with a protruding tubular sleeve extending forwardly from the case. A steel chisel is removably received in the sleeve. A V-shaped support bracket is secured to the bottom of the casing and sleeve for supporting the chisel at a correct angle with respect to the surface being scraped. The rear leg of the bracket is provided with a heat insulating hand grip. An upwardly extending heat insulating hand grip may also be provided on the sleeve if desired.

2 Claims, 3 Drawing Figures

PATENTED JUN 27 1972　　　　　　　　　　3,673,383

INVENTOR
GEORGE V. SOFIA

ELECTRICALLY HEATED SCRAPING TOOL

This invention relates generally to glazier's tools. More specifically it relates to a glazier's chisel having improved heating and gripping means for more effective removal of remaining debris in a window channel.

It is generally well known, to those skilled in the art, that the replacement of a broken rear window glass or a front wind shield in a modern automobile is attended with difficulty in attempting to clear out the window channel groove of small glass fragments, glue and rubber materials that become stuck very hard in the groove of the window channel. This thus becomes a time consuming operation in order to be thoroughly cleaned, thus contributing to labor cost. This situation is therefore in want of improvement.

Accordingly my invention provides a heated channel scraper which has a combined handle and pivoted support attached to the tool case which will permit the operator to effectively position and manipulate the scraper in the channel.

Accordingly it is a principal object of the present invention to provide a glazier's tool which quickly and effectively cleans out the window channels of remaining debris prior to re-setting a new window pane into the same.

Another object is to provide a channel scraper which is heated so that it melts away hard stuck glass and rubber.

Yet another object is to provide a hot channel scraper which includes a supporting leg for maintaining the tool in the best operating angle for obtaining maximum effectiveness of a heated chisel edge.

Yet a further object is to provide a hot channel scraper which, by actual tests, has proven to cut labor time to ⅛ of time now required to clean out the window channel by conventional tools.

Other objects are to provide a hot channel scraper which is simple in design, inexpensive to manufacture, rugged in construction, easy to use and efficient in operation.

These and other objects will be readily evident upon a study of the following specification and accompanying drawing wherein.

Figure 1:
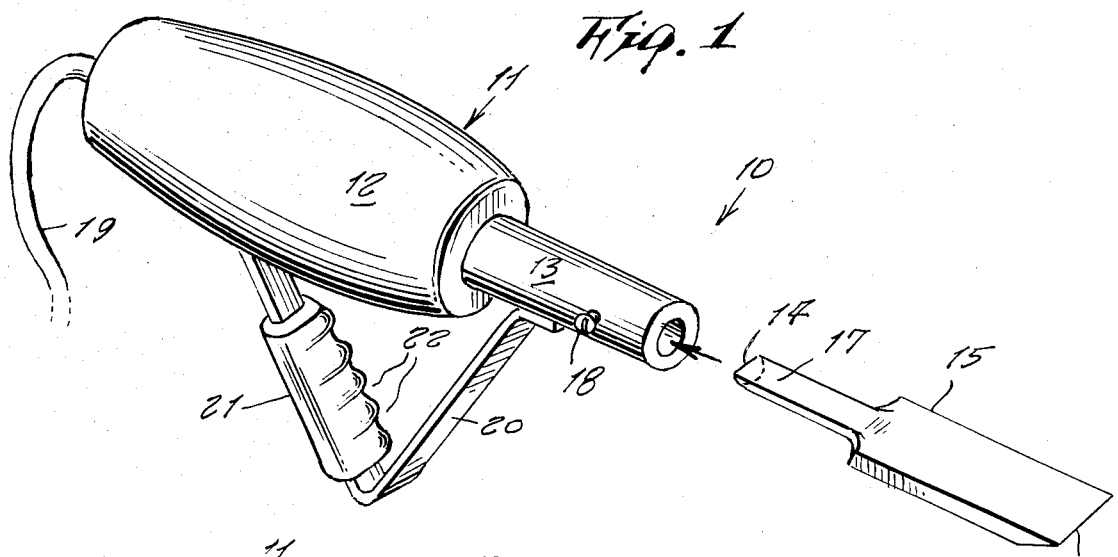
FIG. 1 is a perspective view of the invention.
Figure 2:
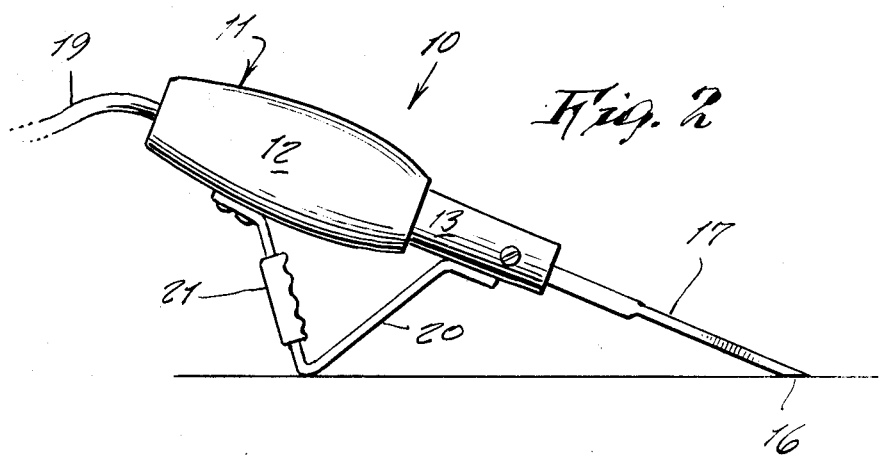
FIG. 2 is a side elevation view thereof with the chisel mounted in the soldering iron.

Referring now to the drawing in detail, the reference numeral 10 represents a hot channel scraper according to the present invention, wherein there is an assembly 11 including a case 12 containing an electrical heater therewithin such as is used in an electric soldering iron, the heater being operated on 110 volts AC or 12 V, 150 to 250 watt electric current. The case includes a forwardly extending, sleeve adapter 13 for receiving the shank end end 14 of a chisel 15 provided at its opposite wider scraper end with a flat chisel edge 16. The chisel end 14 is one half round so to include a flat surface 17 against which a set screw 18 may bear for maintaining the chisel at a precise angle during operative use.

An electric extension cord 19 extends outward of the case and is provided with a male plug at its outer end for insertion into an electric outlet socket so to provide power to the electric heater.

A bracket 20 of V-shape is secured on the underside of the case so to permit the tool to rest at a desired angle during operation respective to the angle ground on the chisel edge 16. A heat insulating hand grasp 21 with finger grooves 22 is fitted on the leg 20.

Figure 3:
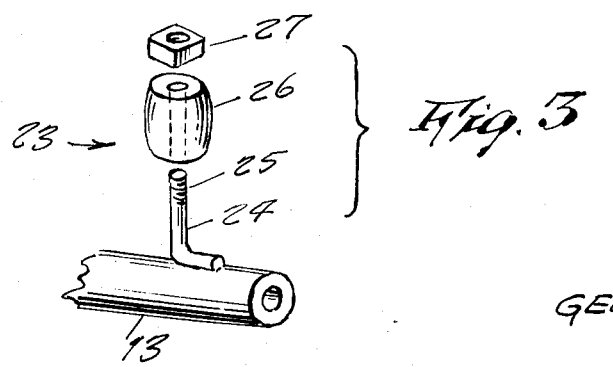
FIG. 3 is a fragmented perspective exploded view of a modified design of a threaded shaft to hold a knob shaped hand grasp.

In FIG. 3 a modified design of hand grasp 23 is shown and which can be secured to the sleeve 13, in addition to grasp 21 for extending upwardly, sidewardly or other diagonal direction, and which includes an L shaped pin 24 welded at the upper surface of the sleeve, the other end having a thread 25 over which is fitted an asbestos knob 26 and a securing nut 27. Thus the tool will have a hand grasp on the top side of the case above the grasp 21 to enable the operator to easily move the tool in any desired direction.

In operative use, it will now be evident that the tool can be held at a maximum efficiency angle during operative use for quick cleaning of remaining debris by a heated chisel.

While various changes may be made in the detail construction, it is to be understood that such changes will be within the spirit and scope of the present invention.

I claim:

1. A tool for scraping windshield retaining channels, comprising a case having electrical heating means therein with an electric extension cord extending rearwardly therefrom and a tubular sleeve extending forwardly from said case, a chisel removably mounted in said sleeve, said chisel having a shank inserted in the sleeve and a wider scraper end extending outwardly of the sleeve wherein one side of said shank surface being planar and the remainder of the chisel surface being rounded to fit the sleeve, a grip and support means on said tool comprising a V-shaped bracket having a forward leg portion attached to the underside of said sleeve and a rear leg portion attached to the underside of case, said portions joined integrally at an apex, said apex providing a supporting fulcrum to tilt and maintain the scraper end at a desired angle of contact in the channel, said rear leg portion of the bracket having a heat insulating hand grip, said bracket being positioned in axial alignment with and under the case and sleeve.

2. A tool as in claim 1, further including a second heat insulating hand grip mounted on the sleeve and extending upwardly therefrom.

* * * * *